Oct. 7, 1924.
E. J. SKAER
1,510,612
AUTOMATIC PARKING INDICATOR
Filed June 12, 1923    2 Sheets-Sheet 1
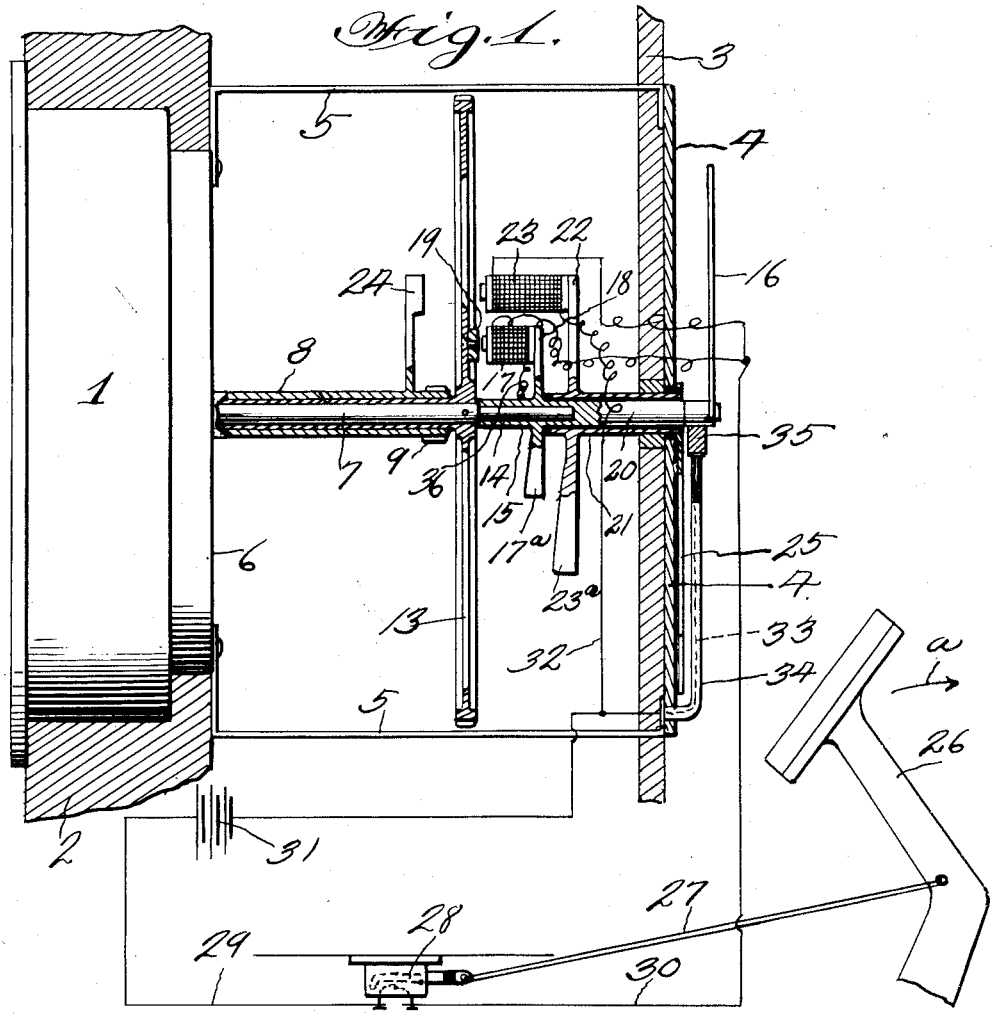
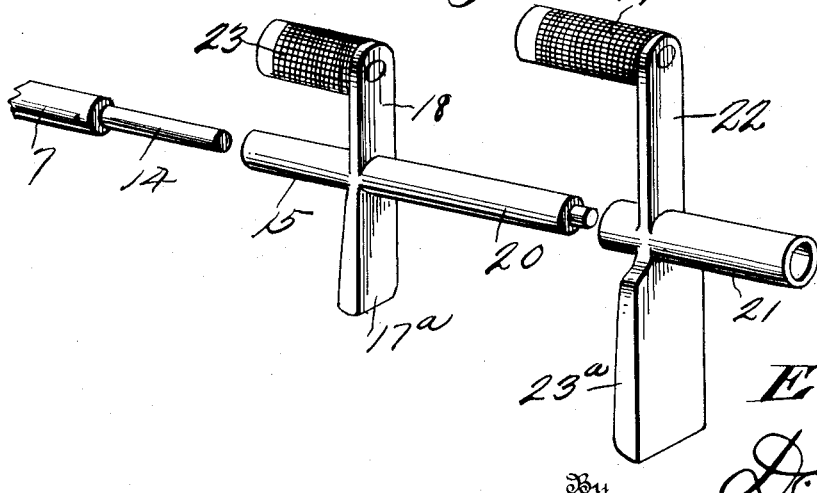
Inventor
E. J. Skaer
By D. Swift
Attorney Oct. 7, 1924.
E. J. SKAER
1,510,612
AUTOMATIC PARKING INDICATOR
Filed June 12, 1923   2 Sheets-Sheet 2
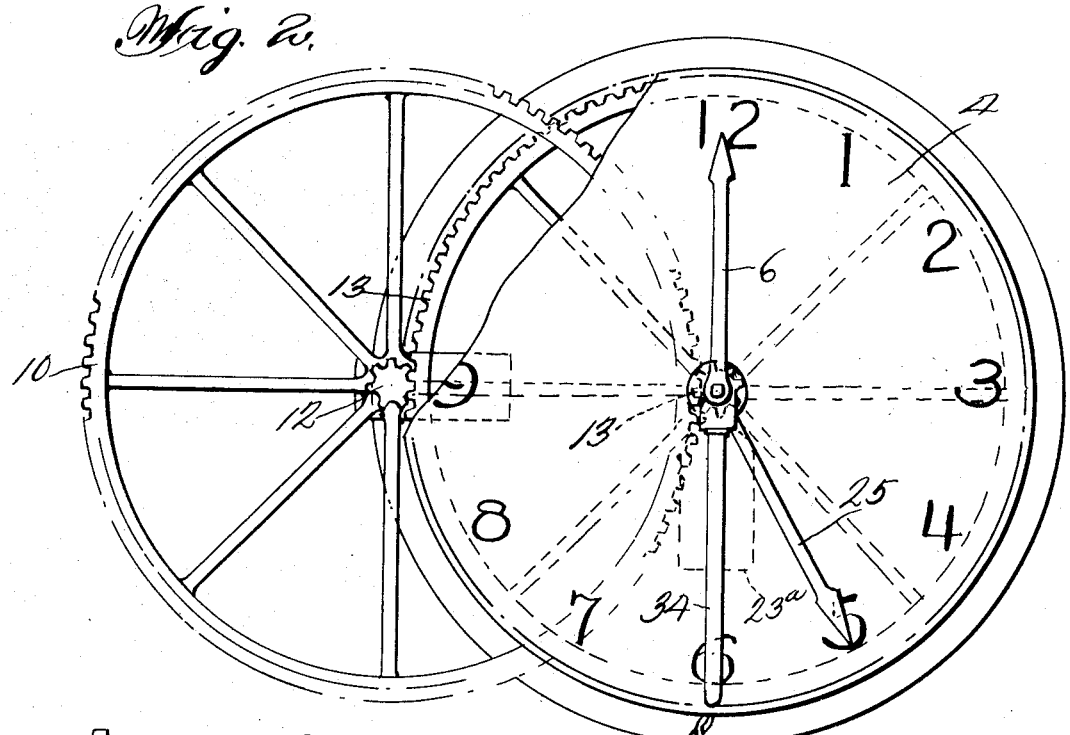
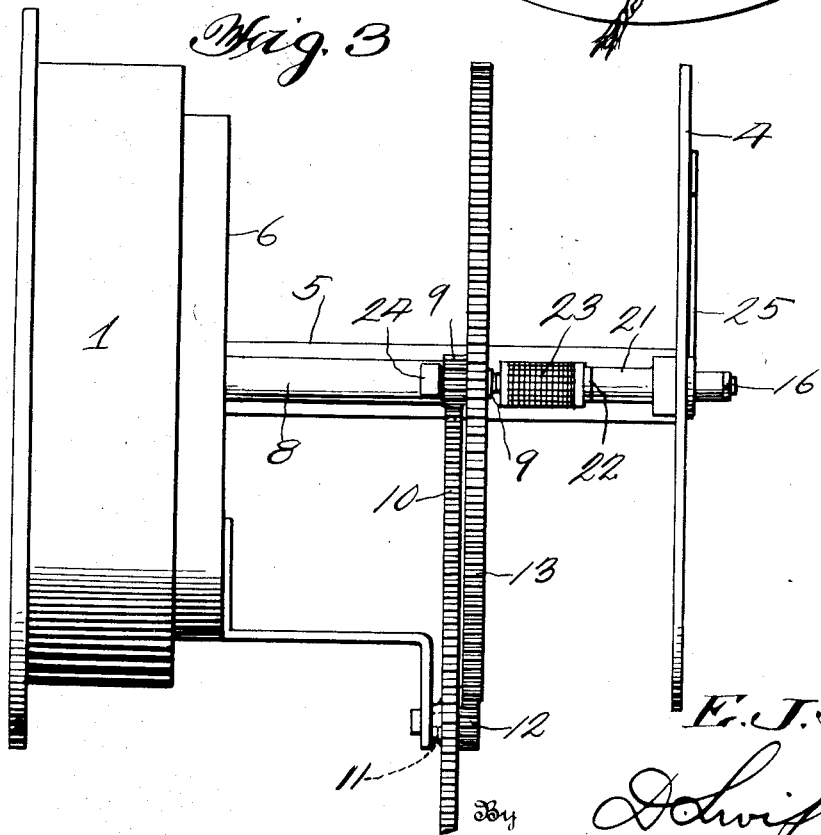
Inventor
E. J. Skaer
By D. Swift
Attorney Patented Oct. 7, 1924.

1,510,612

UNITED STATES PATENT OFFICE.

EDWARD J. SKAER, OF LIBERAL, KANSAS.

AUTOMATIC PARKING INDICATOR.

Application filed June 12, 1923. Serial No. 644,891.

*To all whom it may concern:*

Be it known that I, EDWARD J. SKAER, a citizen of the United States, residing at Liberal, in the county of Seward, State of Kansas, have invented a new and useful Automatic Parking Indicator; and I do hereby declare the following to be a full, clear, and exact description of the invention, such as will enable others skilled in the art to which it appertains to make and use the same.

The invention relates to automatic time indicating devices, adapted for use in connection with automobiles, and has for its object to provide a device of this character for indicating the exact length of time an automobile is parked or allowed to stand in any given place.

A further object is to provide an automobile parking indicating device comprising in combination with a clock, a time indicating dial and indicating pointers in connection with the clock and dial, and controlled from the clutch pedal of the automobile in a manner, whereby when the automobile is stopped and the clutch moved to a neutral position, the device automatically sets the indicating pointers on the dial at the exact time of the clock. When the clutch is again thrown in neutral for the purpose of starting the car, the device automatically sets the indicator pointers at the exact time of the clock. Every period of time for which an automobile is parked can thus be determined accurately, and after a car is parked it can be determined correctly from the face of the dial, the period of time the car has been parked.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a sectional view through a portion of the instrument board and the cowl of an automobile showing the device applied therein in side elevation and partly in section.

Figure 2 is a view in elevation of the device showing the indicator pointer and the indicator dial.

Figure 3 is a top plan view of the device.

Figure 4 is a detail perspective view of the magnet carrying sleeves.

Referring to the drawing, the numeral 1 designates a conventional form of clock. which clock is supported preferably on the front dash 2 of an automobile, and 3 a portion of a cowl, forwardly of the dash 2. The device is shown as applied to a dash and cowl of an automobile, however it is to be understood that the device may be applied to any portion of the automobile, and also that the device may be used generally for other purposes than in connection with an automobile. The clock 1 is provided with a conventional form of face, and secured to the outer side of the cowl 3 is a dial 4. preferably supported by brackets 5 carried by the rear side of the clock 1. Extending from the rear side 6 of the clock 1 is a shaft 7, which shaft rotates with the hour hand of the clock 1, and rotatably mounted on the shaft 7 is a sleeve 8 which rotates with the minute hand of the block 1. The sleeve 8 at its outer end is provided with a gear 9, which meshes with a gear 10 carried by a countershaft 11. The gear 10 is provided with a small gear 12, which meshes with a large gear 13 secured to the shaft 7. The gearing is proportioned, whereby there is a 12 to 1 movement, and consequently indicator hands controlled by the sleeve 8 and the shaft 7 would also have a twelve to one movement. The shaft 7 has rotatably mounted on the reduced portion 14 thereof a sleeve 15, to the outer end of which is secured the hour hand 16 of the indicator. It will be seen that when the magnet 17, carried by the arm 18 of the sleeve 14 is energized, and the sleeve 14 rotated by the magnet 17 being attracted by the magnet member 19 carried by the gear 13, that the hour hand 16 will be moved to the position the same as indicated on the dial of the clock 1, for the reason that the member 19 is always opposite the hour hand of the clock 1, and rotates at the same speed as said hour hand. Rotatably mounted on the outer end 20 of the sleeve 14 is a sleeve 21, which sleeve is provided with a radially disposed arm 22, which supports the magnet 23. When the magnet 23 is energized it is moved around and consequently the sleeve 21 is moved around by the attraction of the member 24, preferably made of iron. The member 24 rotates with the sleeve 8 at the same speed as the minute hand of the clock 1, consequently the minute hand 25 carried by the sleeve 21 will be moved to an indicating position on the dial 4 corresponding to the position on the dial of the clock 1. The magnets 17 and 23 are counterbalanced by weights $17^a$ and $23^a$, thereby allowing the shaft 14 and 21 to easily rotate during the magnetic operation thereof.

The operation of the device is as follows: When the operator stops his machine, the clutch pedal 26 is moved in the direction of the arrow $a$ and to what is known as neutral position. This action imparts a pull on the cable or rod 27, which closes the slide switch 28, thereby placing the wires 29 and 30 in circuit with each other. Wire 29 is in circuit with a battery 31, and the wire 30 is in circuit with the magnets 17 and 23, however the wire 29 is also in circuit with the magnet 23 through the wire 32, consequently the magnet 23 is energized. At the same time the magnet 17 has the other side of its circuit closed through a wire 33 disposed within a conduit 34, the upper end of which has a brush contact 35 with the sleeve 15, and through the wire 36, therefore, it will be seen that both magnets 17 and 23 will be energized. When the magnets 17 and 23 are energized the attractive force thereof will pull said magnets towards the members 19 and 24 carried by the gear 13 of the hour shaft 7 and the minute sleeve 8, which members 19 and 24 are in proper registration with the hour and minute hands of the clock 1, consequently the hour and minute hands will be moved to positions on the dial 4 corresponding to the positions of the clock hands on the clock 1, and indicating on the dial 4 the exact time the operator parked his automobile. However the pedal 26 is moved out of neutral, which action will break the circuits of the magnets 17 and 23, and the clock 1 will continue to run independent of the hour and minute hands 16 and 25 of the indicator, therefore it will be seen that by observing the indicator it will be easy for the occupant of the car to check on the exact time he parked, or for an officer of the law to ascertain the time of parking, and by observing the clock 1, in combination with the reading of the dial 4, the exact length of time the car has been parked can be ascertained.

It is to be understood that the electric circuit may be of any construction or arrangement, and that a conventional form of circuit is shown for purposes of illustration.

The invention having been set forth what is claimed as new and useful is:

1. The combination with an automobile, a clock carried by said automobile, an indicator dial carried by the automobile, of hour and minute hands adjacent the face of the indicator dial, said hour and minute hands being mounted on shafts, said shafts being provided with magnets, and magnetic elements carried by the rear ends of the hour and minute shafts of the clock, means for energizing said magnets upon the stopping of the automobile, said magnets forming means whereby in combination with the magnetic elements of the clock hour and minute hand shafts, the indicator hands will be moved to position registering with the positions of the clock hands, and means whereby the magnets will be deenergized during the stopping operation of the automobile.

2. The combination with an automobile, a clock carried by said automobile, of a time registering device whereby the time of stopping of the automobile may be registered, said device comprising extension shafts carried by the clock and rotatably mounted within each other, a twelve to one gear connection between said extension shafts, independently rotatable shafts axially aligned with the first mentioned shafts, said independent shafts being provided with minute and hour hands, said minute and hour hands cooperating with a clock face dial, magnets carried by the independent shafts, said magnets cooperating with magnetic elements carried by the clock shafts, and counterweights carried by the independent shafts.

3. The combination with a clock, of a time indicating device therefor whereby a particular time may be indicated, said device comprising clock shafts, said clock shafts having a twelve to one gear connection, axially aligned independent shafts, magnets carried by the independent shafts, magnetic elements carried by the clock shafts, counterweights carried by the independent shafts, a dial having indicia thereon, and hour and minute hands carried by the independent shafts and disposed adjacent the dial.

In testimony whereof I have signed my name to this specification in the presence of two subscribing witnesses.

EDWARD J. SKAER.

Witnesses:
CHAS. M. TUCKER,
S. H. REYNOLDS.